July 3, 1928.
W. FRANKEL
PEEPHOLE FOR DOORS
Filed Nov. 30, 1926
1,676,140
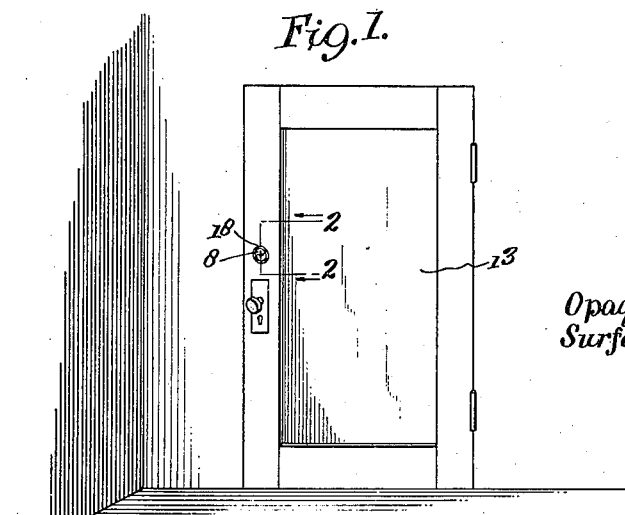
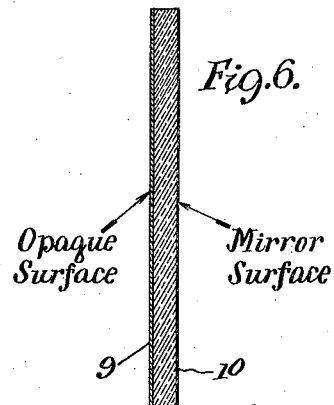
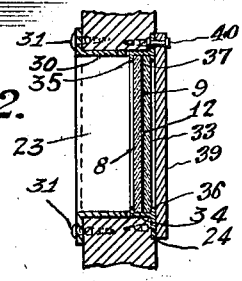
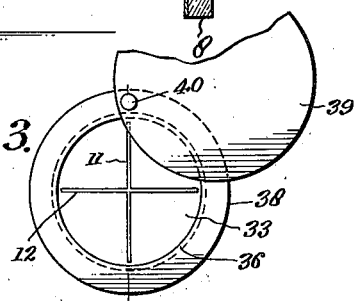
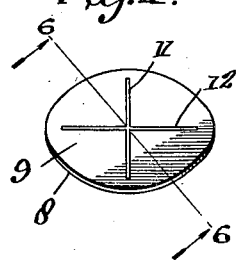
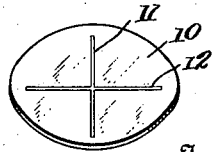
Inventor
W. Frankel
by C. P. Goepel
Attorney Patented July 3, 1928.

1,676,140

UNITED STATES PATENT OFFICE.

WILLIAM FRANKEL, OF ASTORIA, NEW YORK.

PEEPHOLE FOR DOORS.

Application filed November 30, 1926. Serial No. 151,698.

The present invention relates to improvements in peepholes for doors, and has for an object to render visible to an observer within an enclosure such as a room or dwelling the exterior on a broad scope and to prevent one on the outside from being able to detect the observing eye.

A feature of the present invention is the reflecting surface disposed in such a manner as to reflect light rays into the eye of an unauthorized observer who should attempt to view the interior of an enclosure through the peephole.

Another feature of the invention is the light absorbing surface on the inside of the device which aids in preventing interference with the vision of an observer looking through the peephole from the interior of the enclosure.

A further feature of the invention is the cover, by means of which all vision through the device may be obscured.

Still another feature of the invention is the location of the peephole near the inner side of the door so as to limit the range of vision of an unauthorized person who should endeavor to secure a view of the enclosure and its contents.

With the foregoing and other objects in view, the invention will be more fully described hereinafter and will be more particularly pointed out in the claim appended hereto.

In the drawings, wherein like symbols refer to like or corresponding parts throughout the several views, Figure 1 is a fragmentary interior view of a room having a door with the improved device installed therein.

Figure 2 is an enlarged vertical sectional view taken on the line 2—2 in Figure 1.

Figure 3 is a plan view of the unit from one side.

Figure 4 is a perspective view of the mirror showing its opaque side.

Figure 5 is a similar view showing the silvered side of the mirror.

Figure 6 is a cross section through the mirror taken on the line 6—6 but greatly enlarged.

Referring more particularly to the drawings, 8 designates a disc of glass or other material appropriate for the purpose having one side thereof silvered and provided with a coating 9 of some opaque light absorbing substance such as bronze or black paint or the like, thus providing an opaque side and a reflecting side 10. The coating and silver deposit are scratched through at one or more places to produce transparent areas through which the eye may see when placed in close proximity thereto. In one embodiment two lines 11 and 12 are scratched through the silvered and opaque coatings and intersect at the center of the disc to form transparent areas through which the observations may be made. This construction gives a wide latitude of vision and yet preserves the reflecting areas and the functions thereof.

The disc so constructed is mounted in a holder suitable for application in an appropriate support such as the door 13. The holder shown is of sheet metal in the form of an annular rim 34 adapted to receive and encompass the periphery of the disc 8. An annular inturned flange 35 formed at one end of the rim engages the disc to confine it at one side.

The mirror 8 is disposed in the holder as above described and a plain lens or pane of non-breakable glass 33 superposed upon its coated side. The holder 34 is provided with the out-turned attaching flange 36 which is pierced at spaced intervals to receive fastening devices such as screws, nails or the like. Pivoted as indicated at 40 to the flange 38 is a cover plate 39.

Figure 3 shows the partly open position of the cover 39, same having been swung about the pivot bolt 40 to uncover the peephole. The mirror 8 is disposed with its mirror back on the inside of the door and with its glass reflecting surface on the outside of the door. The holder may be mounted in the door in the manner shown in Figure 2, with a cover 39 on the inside of the room or building accessible only to the proprietor of the premises whereby the vision of an intruder on the outside may be positively shut off by the opaque cover 39. In Figures 1 and 2 the device is shown as installed in a door provided with the port or opening 23 to receive same, a mortise 24 encircling the port or the inner side of the door to receive the attaching flange 36, which is countersunk flush with the inner surface of the door. Nails, screws or other fastenings may be driven into the door through the openings formed at spaced intervals in the flange 36 to securely hold the device in place. The device is mounted near the inner face of the door with the mirror surface toward the exterior and the opaque surface 9 toward the interior of the room or enclosure, whereby an intruder on the outside may be observed by the householder from within without detection. The intruder on the outside will not be able to get close enough to the peephole formed by scratch lines 11 and 12 to enable him to detect the eye of the proprietor of the dwelling nor to gain any valuable knowledge of the surroundings within, owing to the thickness of the door, and furthermore, his vision will be interrupted by the light reflected from the mirror surface.

I have illustrated and described a preferred and satisfactory embodiment of my invention but it is obvious that changes may be made therein within the spirit and scope thereof as defined in the appended claim.

What is claimed is:—

A peephole device for doors, comprising an annular rim having spaced inwardly extending means providing an annular groove within the rim, said rim having an outwardly extending flange for engagement against the side of a door about an opening therein to support the rim in the opening, a mirror having an opaque coating on its rear side mounted in the groove between the inwardly extending means of the rim and facing outwardly therethrough, a protective transparent disc mounted in said groove against said opaque coating, a portion of said coating of the mirror being removed to provide a sight, and an opaque cover pivoted to the device for covering the inner side of the rim and adapted to be swung on its pivot to one side of the rim to permit inspection of outside objects through the device.

In testimony that I claim the foregoing as my invention, I have signed my name hereto.

WILLIAM FRANKEL.